(12) United States Patent
Yoda et al.

(10) Patent No.: US 7,602,527 B2
(45) Date of Patent: Oct. 13, 2009

(54) ALBUM CREATING APPARATUS, ALBUM CREATING METHOD AND PROGRAM

(75) Inventors: Akira Yoda, Kanagawa (JP); Shuji Ono, Kanagawa (JP); Kimiko Tachikawa, Tokyo (JP); Yasuhiko Kaneko, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 562 days.

(21) Appl. No.: 11/366,555

(22) Filed: Mar. 3, 2006

(65) Prior Publication Data
US 2006/0197985 A1    Sep. 7, 2006

(30) Foreign Application Priority Data
Mar. 4, 2005  (JP)  ............................ 2005-060612
Jan. 30, 2006 (JP)  ............................ 2006-021535

(51) Int. Cl.
*G06K 1/00* (2006.01)
(52) U.S. Cl. ................. 358/1.9; 358/1.18; 382/162; 382/163; 382/167
(58) Field of Classification Search ................ 358/1.9, 358/1.18; 382/162, 163, 167
See application file for complete search history.

(56) References Cited
U.S. PATENT DOCUMENTS 6,324,545 B1 * 11/2001 Morag .................. 707/202
7,054,508 B2 * 5/2006 Hanamoto ............ 382/305
7,262,778 B1 * 8/2007 Edwards et al. ........ 345/589
2003/0160824 A1 * 8/2003 Szumla .................. 345/769
2005/0200912 A1 * 9/2005 Yamakado et al. ..... 358/450
2008/0107331 A1 * 5/2008 Kojima et al. ......... 382/162

FOREIGN PATENT DOCUMENTS
JP         10-126731 A        5/1998

* cited by examiner

*Primary Examiner*—Mark K Zimmerman
*Assistant Examiner*—Miya J Cato
(74) *Attorney, Agent, or Firm*—Birch, Stewart, Kolasch & Birch, LLP (57) ABSTRACT

An album with the color arrangement harmonized with images is provided. An album creating apparatus for creating an album including a plurality of images includes: a color extraction section for extracting a plurality of colors included in the plurality of images; an appearance frequency of color calculating section for calculating the appearance frequency of the plurality of colors extracted by the color extraction section; a characteristic color determining section for determining characteristic colors which are colors characteristic of the plurality of images based on the appearance frequency of the plurality of colors calculated by the appearance frequency of color calculating section; and a template color selecting section for selecting colors for template which are used for a template of the album including the plurality of images based on the characteristic colors determined by the characteristic color determining section.

12 Claims, 6 Drawing Sheets

| BACKGROUND COLOR / CHARACTER COLOR | COLOR 601 | COLOR 602 | COLOR 603 | COLOR 604 | ...... | COLOR 664 |
|---|---|---|---|---|---|---|
| COLOR 601 | 0 | 3 | 2 | 1 | ...... | 2 |
| COLOR 602 | 3 | 0 | 1 | 1 | ...... | 4 |
| COLOR 603 | 2 | 1 | 0 | 4 | ...... | 0 |
| COLOR 604 | 1 | 1 | 4 | 0 | 0 | 1 |
| ...... | ...... | ...... | ...... | ...... | ...... | ...... |
| COLOR 664 | 2 | 4 | 0 | 1 | ...... | 0 |

ALBUM CREATING APPARATUS, ALBUM CREATING METHOD AND PROGRAM

CROSS REFERENCE TO RELATED APPLICATION

The present application claims priority from Japanese Patent Applications Nos. JP 2005-060612 filed on Mar. 4, 2005 and JP 2006-21535 filed on Jan. 30, 2006, the contents of which are incorporated herein by reference.

BACKGROUND OF THE INVENTION

1. Field of the Invention

The present invention relates to an album creating apparatus, an album creating method and a program. Particularly, the present invention relates to an album creating apparatus and an album creating method for creating an album including a plurality of images, and a program for the album creating apparatus.

2. Related Art

Conventionally, a technology for creating an album has been known that the map of travel destination is disposed at the center of a screen, images are disposed around the map based on tag information such as position information and image-capturing time information associated with image data captured in traveling, and the images and the image-capturing positions on the map are connected by lines, so that the relationship between the map and the images can be identified, for example as disclosed in Japanese Patent Application Publication No. 10-126731.

Here, if an album is created by the technology disclosed in the Japanese Patent Application Publication No. 10-126731, images such as a sand beach, the ocean and the sky which are captured on a beach are disposed around the map almost black in the album sometimes. Since the light color included in the images of the sand beach, the ocean and the sky is not visually harmonized with the black color included in the map of the album, the user who views the album feels uncomfortable. Therefore, it is preferred that colors for the title of the album, the background of each page of the album and the flame of each image to enhance the image are harmonized with colors for images stored in the album. Additionally, it is preferred that the user can easily create an album with an appropriate color arrangement and view the same without any complicated work to determine the color arrangement for the album.

SUMMARY OF THE INVENTION

Thus, it is an object of the present invention to provide an album creating apparatus, an album creating method and a program which are capable of solving the problem accompanying the conventional art. The above and other objects can be achieved by combining the features recited in independent claims. Then, dependent claims define further effective specific example of the present invention.

To solve the above-described problem, a first aspect of the present invention provides an album creating apparatus for creating an album including a plurality of images. The album creating apparatus includes: an image color arrangement analyzing section for analyzing the color arrangement of a plurality of images; and an album color arrangement determining section for determining the color arrangement for a template of an album including a plurality of images.

The image color arrangement analyzing section has a color extraction section for extracting a plurality of colors included in the plurality of images and a appearance frequency of color calculating section for calculating the appearance frequency of the plurality of colors extracted by the color extraction section. The album color arrangement determining section may have a characteristic color determining section for determining characteristic colors which are colors characteristic of the plurality of images based on the appearance frequency of the plurality of colors calculated by the appearance frequency of color calculating section, and a template color selecting section for selecting colors for template which are used for the template of the album including a plurality of images.

The album color arrangement determining section further includes a color pallet information storage section for storing plural pieces of information on a color pallet indicative of a plurality of predetermined color combinations. The template color selecting section may select a color pallet including the characteristic colors determined by the characteristic color determining section and select the colors included in the selected color pallet as colors for template.

The characteristic color determining section may determine a plurality of characteristic colors in the plurality of images based on the appearance frequency of the plurality of colors calculated by the appearance frequency of color calculating section. The template color selecting section may select a color pallet including the plurality of characteristic colors determined by the characteristic color determining section and select the colors included in the selected color pallet as colors for template.

The album color arrangement determining section may further include an average appearance frequency information storage section for previously storing the average appearance frequency indicative of the average frequency at which each of the plurality of colors may be appeared in the image in association with each of the plurality of colors. The characteristic color determining section may determine that colors of which appearance frequency calculated by the appearance frequency of color calculating section is higher than the average appearance frequency stored in the average appearance frequency information storage section are the characteristic colors of the plurality of images.

The album color arrangement determining section may further include a combination color information storage section for storing combination color information indicative of colors to be used for the back ground of characters in association with colors for the characters. The template color selecting section may select colors included in the template and used for either of the characters or the background of the characters and select colors stored in the combination color information storage section in association with the selected colors as colors for the other of the characters or the background.

The album color arrangement determining section may further include a color pallet information storage section for storing plural pieces of information on a color pallet indicative of a plurality of predetermined color combinations. The combination color information storage section may store combination color information in association with the color pallet stored in the color pallet information storage section and each of the plurality of colors included in the color pallet. The template color selecting section may select a color pallet including the characteristic colors determined by the characteristic color determining section, select the colors included in the selected color pallet as colors included in the template and used for either of the characters or the background and select the colors stored in the combination color information storage section in association with the selected color pallet and the selected colors as colors used for the other of the characters of the background.

The album color arrangement determining section may further include a color pallet information storage section for storing plural pieces of information on a color pallet indicative of a plurality of predetermined color combinations. The template color selecting section may select a color pallet including a color of which difference from the characteristic color determined by the characteristic color determining section is less than a predetermined color difference and select the color included in the selected color pallet as a color for template.

The characteristic color determining section may determine a plurality of characteristic colors in a plurality of images based on the appearance frequency of the plurality of colors calculated by the appearance frequency of color calculating section. The template color selecting section may select a color pallet including a plurality of colors of which difference from the plurality of characteristic colors determined by the characteristic color determining section is less than a predetermined color difference and select the colors included in the selected color pallet as colors for template.

The album creating apparatus may further include an image classification section for classifying a plurality of images into each page. The image color arrangement analyzing section may analyze for each page the color arrangement of the plurality of images classified into each page by the image classification section. The album color arrangement determining section may determine the color arrangement of the template of an album including a plurality of images for each page classified by the image classification section based on the color arrangement of the plurality of images analyzed by the image analyzing section.

A second aspect of the present invention provides an album creating method for creating an album including a plurality of images. The album creating method includes the steps of: analyzing the color arrangement of a plurality of images; and determining the color arrangement of the template of an album including a plurality of images.

A third aspect of the present invention provides a program for an album creating apparatus for creating an album including a plurality of images. The program operates the album creating apparatus to function as: an image color arrangement analyzing section for analyzing the color arrangement of a plurality of images; and an album color arrangement determining section for determining the color arrangement for a template of an album including a plurality of images.

Here, all necessary features of the present invention are not listed in the summary of the invention. The sub-combinations of the features may become the invention.

According to the present invention, an album with the color arrangement harmonized with images can be created.

DETAILED DESCRIPTION OF THE INVENTION

Hereinafter, the present invention will now be described through preferred embodiments. The embodiments do not limit the invention according to claims and all combinations of the features described in the embodiments are not necessarily essential to means for solving the problems of the invention.

Figure 1:
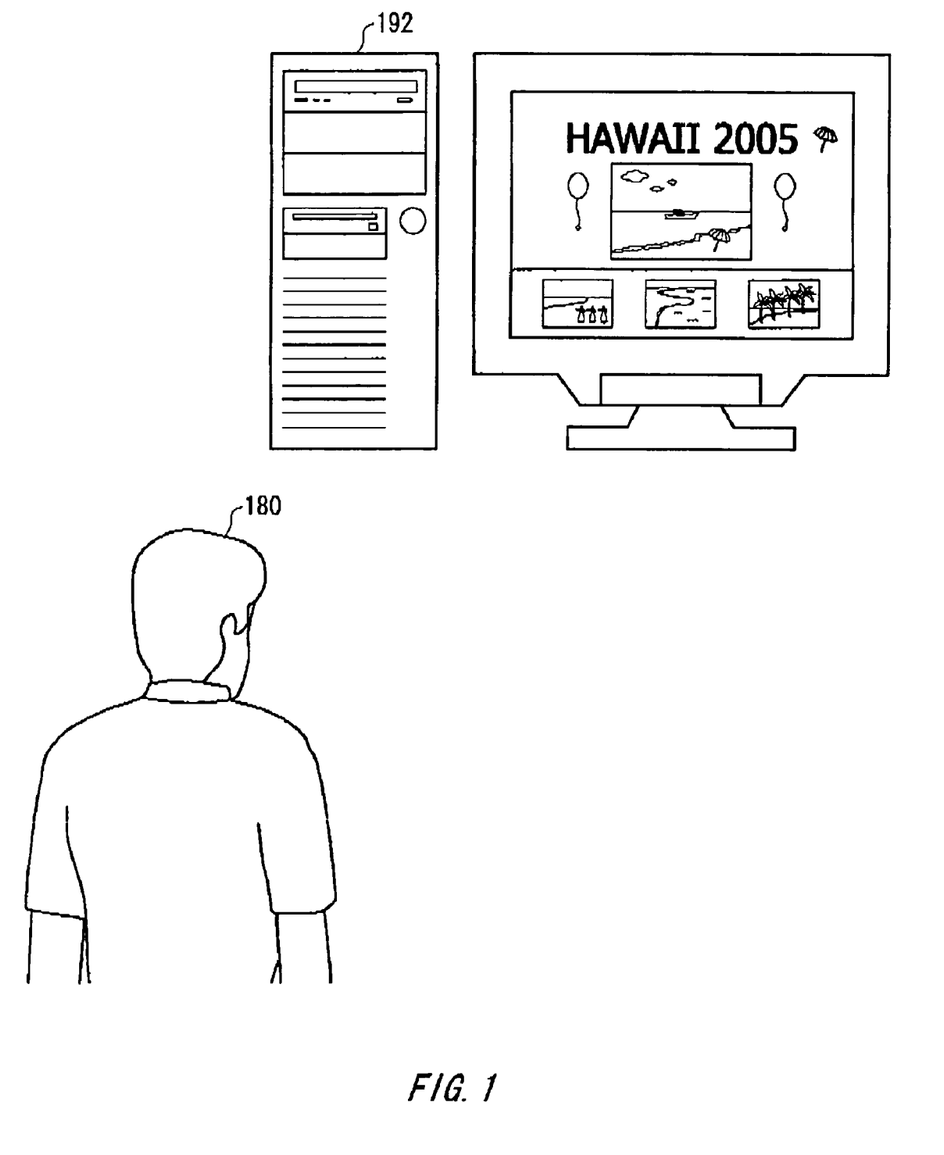
FIG. 1 shows an example of the environment for the usage of an album creating apparatus 192.

FIG. 1 shows an example of the environment for the usage of an album creating apparatus 192 according to an embodiment of the present invention. The album creating apparatus 192 creates an album including a plurality of images and outputs the same on a display. The album creating apparatus 192 extracts colors having the highest appearance frequency, such as clear white and light blue in the images of a sand beach, the ocean and the sky captured on a beach. Then, the album creating apparatus 192 selects a color pallet including the extracted colors from a plurality of color pallets and determines the color arrangement of the album using the colors included in the selected color pallet. Here, the album creating apparatus 192 may be an apparatus for creating an album including a plurality of images and printing the same, and also may be an apparatus for displaying the plurality of images. For example, the album creating apparatus 192 may be a PC, an electronic album, a HDTV and a printer.

The above-described album creating apparatus 192 can automatically create with the color arrangement harmonized with colors included in the images. Therefore, a user 180 who views the album can more enjoyably view the album without feeling uncomfortable about the color arrangement of the album.

Figure 2:
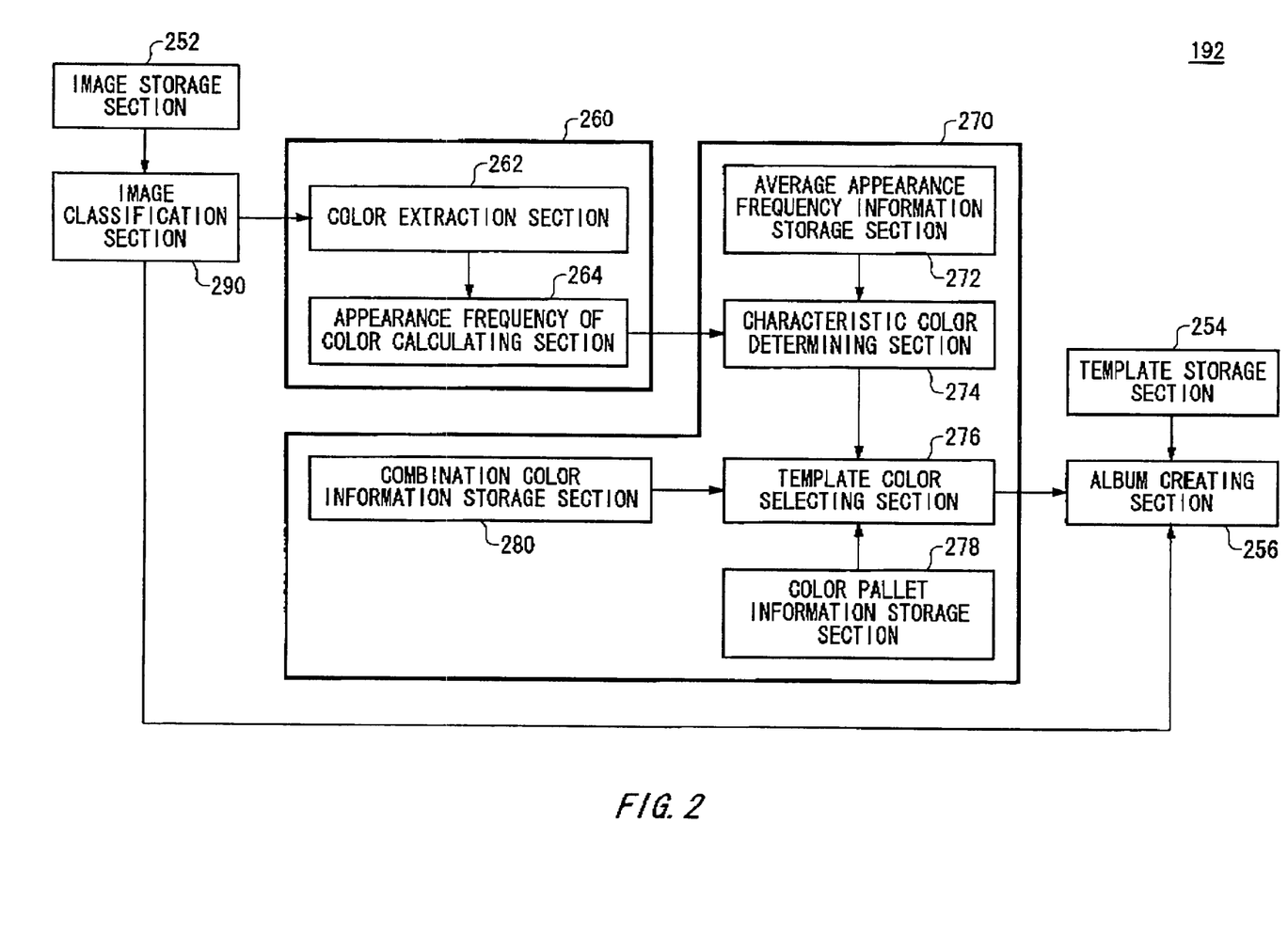
FIG. 2 shows an example of the block configuration of the album creating apparatus 192.

FIG. 2 shows an example of the block configuration of the album creating apparatus 192. The album creating apparatus 192 includes an image storage section 252, an image classification section 290, an image color arrangement analyzing section 260, an album color arrangement determining section 270, a template storage section 254 and an album creating section 256. The image color arrangement analyzing section 260 has a color extraction section 262 and an appearance frequency of color calculating section 264. The album color arrangement determining section 270 has a characteristic color determining section 274, a template color selecting section 276, a color pallet information storage section 278, a combination color information storage section 280 and an average appearance frequency information storage section 272.

The image storage section 252 stores a plurality of images used for creating an album. The image color arrangement analyzing section 260 analyzes the color arrangement of the plurality of images. Specifically, the image color arrangement analyzing section 260 analyzes the color arrangement of a plurality of images stored in the image storage section 252. The template storage section 254 stores templates indicative of the predetermined patterns. For example, the template storage section 254 stores color arrangement regions indicative of the composition of regions to be colored, such as the title of the album and the background region of the album. Additionally, the template storage section 254 may further store position information indicative of the position at which the image is placed and the size of the image.

The album color arrangement determining section 270 determines the color arrangement of templates of the album including the plurality of images based on the color arrangement of the plurality of images analyzed by the image color arrangement analyzing section 260. Then, the album creating section 256 colors the templates stored in the template storage section 254 with the color arrangement determined by the album color arrangement determining section 270. Then, the album creating section 256 disposes the plurality of images stored in the image storage section 252 based on the templates stored in the template storage section 254 to create the album.

The color extraction section 262 extracts a plurality of colors included in the plurality of images. Specifically, the color extraction section 262 extracts the plurality of colors included in the plurality of images stored in the image storage section 252. Then, the appearance frequency of color calculating section 264 calculates the appearance frequency of the plurality of colors extracted by the color extraction section 262. Here, the appearance frequency is based on the area for each of the colors in the image. Additionally, when the image storage section 252 stores digital image data, the color extraction section 262 may extract a color per pixel of the image data, and the appearance frequency of color calculating section 264 may calculate the appearance frequency based on the total number of pixels having the colors extracted by the color extraction section 262.

The average appearance frequency information storage section 272 previously stores the average appearance frequency indicative of the average frequency at which each of the plurality of colors may be appeared in association with each of the plurality of colors. The characteristic color determining section 274 determines characteristic colors which are colors characteristic of the plurality of images based on the appearance frequency of the plurality of colors calculated by the appearance frequency of color calculating section 264. Specifically, the characteristic color determining section 274 determines that the color of which appearance frequency calculated by the appearance frequency of color calculating section 264 is larger than the average appearance frequency stored in the average appearance frequency information storage section is the characteristic colors of the plurality of images. Therefore, if an image on which a landscape in natural is shown includes purple which exists little in nature, the characteristic color determining section 274 can determine that the purple is the characteristic color in the image.

The color pallet information storage section 278 stores plural pieces of information on a color pallet indicative of a plurality of predetermined color combinations. Here, the color pallet may include a plurality of color combinations which are visually harmonized each other. Additionally, the color pallet information storage section 278 may include any color pallet opened to public through Internet and also may include a color pallet recorded on a recording medium such as a semiconductor memory.

The template color selecting section 276 selects colors for template which are colors used for the template of the album including the plurality of images. Specifically, the template color selecting section 276 selects a color pallet including the characteristic colors determined by the characteristic color determining section 274 and selects the colors included in the selected color pallet as colors for template. More specifically, the template color selecting section 276 may select a color pallet including colors of which difference from the characteristic colors determined by the characteristic color determining section 274 is less than a predetermined color difference and select the colors included in the selected color pallet as colors for template. Therefore, the album creating apparatus 192 can create an album by coloring templates using the colors similar to the characteristic colors of the images. Accordingly, the user 190 can easily create an album with the color arrangement harmonized with the colors included in the images by using the album creating apparatus 192.

Here, the characteristic color determining section 274 may determine a plurality of characteristic colors in a plurality of images based on the appearance frequency of a plurality of colors calculated by the appearance frequency of color calculating section 264. Then, the template color selecting section 276 may select a color pallet including the plurality of characteristic colors determined by the characteristic color determining section 274 and select the colors included in the selected color pallet as colors for template. Specifically, the template color selecting section 276 may select a color pallet including a plurality of colors of which difference from the plurality of characteristic colors is less than a predetermined color difference and select the colors included in the selected color pallet is colors for template. Therefore, the user 190 can easily create an album with colors harmonized with the colors similar to each of the plurality of characteristic colors in the images.

The combination color information storage section 280 stores combination color information indicative of colors to be used for the background of characters in association with colors used for the characters. For example, the combination color information storage section 280 stores combination color information indicative of one or more colors to be used for the background of characters in association with colors used for the characters. Specifically, the combination color information storage section 280 stores, as colors to be used for the background of the characters, a plurality of colors which are harmonized with the colors for characters through human eye, and are clear when the plurality of colors are used for the colors for the background of the characters in association with the colors used for the characters. Then, the combination color information storage section 280 stores combination color information in association with the color pallet stored in the color pallet information storage section 278 and each of the plurality of colors included in the color pallet.

Then, the template color selecting section 276 selects colors included in the template and used for either of the characters or the background of the characters, and selects the colors stored in the combination color information storage section 280 in association with the selected colors as the colors used for the other of the characters or the background. Specifically, the template color selecting section 276 selects a color pallet including the characteristic colors determined by the characteristic color determining section 274, selects the colors included in the selected color pallet as the colors included in the template and used for either of characters or the background of the characters and selects the colors stored in the combination color information storage section 280 in association with the selected color pallet and the selected colors as the colors used for the other of the characters or the background. Therefore, when the album creating apparatus 192 determines the character colors among the colors included in the template which is selected from the characteristic colors include in the image, the album creating apparatus 192 can determine colors which are harmonized with the determined colors and which show the characters up to create an album.

The image classification section 290 classifies a plurality of images into each page. For example, the image classification section 290 may classify a plurality of images into each page in the order corresponding to the image-capturing time at which the plurality of images stored in the image storage section are captured. At this time, the image classification section 290 may classify the plurality of images into each page by sequentially selecting the plurality of images in the order corresponding to the image-capturing time in order that the number of images classified into each page is approximately equal for each page. Additionally, the image classification section 290 divides a plurality of images into image groups of which number is equal to the number of pages in the album by dividing the images in descending order of the length of the image-capturing distance based on the image-capturing times at which the plurality of images stored in the image storage section 252 are captured. Here, the image-capturing distance is a distance between the adjacent image-capturing times when the images are arranged in the order corresponding to the image-capturing time. Then, the image classification section 290 may classify the plurality of images into each page by allocating the plurality of divided image groups to each page one by one. Additionally, the image classification section 290 may divide the plurality of images into image groups of which number is equal to the number of pages of the album based on the distribution of the image-capturing positions and allocate the divided image groups to each page one by one to classify the plurality of images into each page. At this time, the image classification section 290 may divide the plurality of images into the image groups of which number is equal to the number of the album in descending order of the length of the distance between the image capturing positions at which the adjacent images are captured when the images are arranged in the order corresponding to the image-capturing time.

Then, the image color arrangement analyzing section 260 analyzes for each page the color arrangement of the plurality of images classified into each page by the image classification section 290. Then, the album color arrangement determining section 270 determines, for each page classified by the image classification section 290, the color arrangement of the template of the album including the plurality of images based on the color arrangement of the plurality of images analyzed by the image color arrangement analyzing section 260. Specifically, the color extraction section 262 extracts, for each page classified by the image classification section 290, a plurality of colors included in the plurality of images classified into each page by the image classification section 290. Then, the appearance frequency of color calculating section 264 calculates, for each page classified by the image classification section 290, the appearance frequency of the plurality of colors extracted for each page by the color extraction section 262. Then, the characteristic color determining section 274 determines, for each page classified by the image classification section 290, the characteristic colors which are colors characteristic of the plurality of images based on the appearance frequency of the plurality of colors calculated for each page by the appearance frequency of color calculating section 264. Then, the template color selecting section 276 selects, for each page classified by the image classification section 290, the colors for template which are colors used for the template of the album including the plurality of images based on the characteristic color for each page determined by the characteristic color determining section 274. Therefore, the album creating apparatus 192 can arrange colors for each page using the colors harmonized with the characteristic colors of the plurality of images allocated into each page. Here, the pages described in the present embodiment may be center-spreads, and also may be one page included in the center-spreads.

The above-described album creating apparatus 192 can create an album with the color arrangement visually harmonized with the images stored in the album. For example, when an album will be created using images in which the sand beach, the ocean and the sky are shown on many times, the album creating apparatus 192 automatically creates the album using the colors in the color pallet including light colors harmonized with the images, such as white and light blue. Therefore, the user 180 can enjoyably view the album without feeling uncomfortable about the color arrangement of the album.

Figure 3:
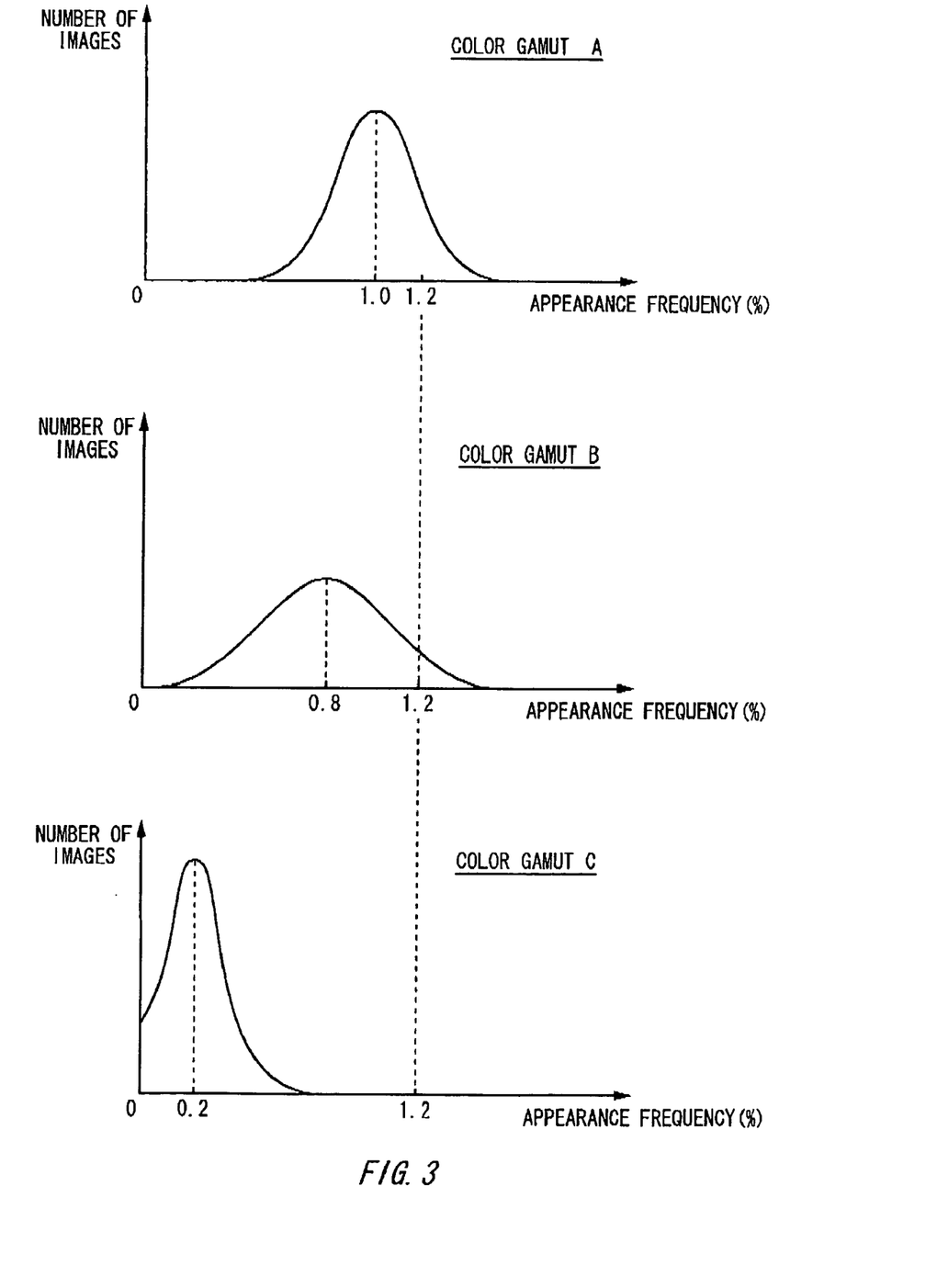
FIG. 3 shows an example of appearance frequency of colors in images.

FIG. 3 shows an example of appearance frequency of colors in images. FIG. 3 shows, for each of a plurality of color gamut (color gamut A, color gamut B and color gamut C) into which a color space is divided, the distribution of the number of images with respect to appearance frequency at which colors included in each color gamut appear in the image. Here, the appearance frequency may be a value obtained by dividing the area for the color for each color gamut in the image by the total area of the image. Additionally, the distribution of the number of images may be previously determined, or may be derived from a plurality of images captured by the user 180.

Then, the average appearance frequency information storage section 272 stores the average appearance frequency in the distribution of the number of images. For example with reference to FIG. 3, the average appearance frequency information storage section 272 stores 1%, 0.8%, and 0.2% for each of the average appearance frequency of the color in a color gamut A, a color gamut B and a color gamut C. If the appearance frequency of color calculating section 264 calculates the appearance frequency of color of the color gamut A, the color gamut B and the color gamut C as 1.2%, the characteristic color determining section 274 determines characteristic colors based on the ratio between the average appearance frequency and the appearance frequency where, the color gamut A is 1.2, the color gamut B is 1.5 and the color gamut C is 6. In this example, the characteristic color determining section 274 determines that colors included in the color gamut C in which the ratio of the appearance frequency to the average appearance frequency is larger will be characteristic colors.

Then, the template color selecting section 276 selects a color pallet including the characteristic color determined by the characteristic color determining section 274. At this time, the template color selecting section 276 may calculate the color difference from the color proximate to the characteristic color determined by the characteristic color determining section 274, that is, the color little difference from the characteristic color determined by the characteristic color determining section 274 among a plurality of colors included in the color pallet and select a color pallet including the color having the least color difference as the color pallet used to arrange the colors for the album. Here, the characteristic color determining section 274 may select the characteristic color from the colors which are more frequently appeared in each of the plurality of color gamuts. The template color selecting section 276 may select the color pallet including the plurality of characteristic colors determined by the characteristic color determining section 274. At this time, the template color selecting section 276 may calculate, for each of the plurality of color pallet, the color difference between each of the plurality of characteristic colors determined by the characteristic color determining section 274 among the plurality of colors included in the color pallet and the color proximate to each of the characteristic colors and select a color pallet in which the total amount of color difference for each of the plurality of characteristic colors is minimum as the color pallet used to arrange the colors for the album.

The characteristic color determining section 274 may determine that the colors which are more frequently appeared than the average appearance frequency is more characteristic colors in the plurality of images. Additionally, the characteristic color determining section 274 may determine that the color which are determined as the characteristic colors in more images will be the more characteristic colors in a plurality of images.

Here, the average appearance frequency information storage section 272 may store the distribution of the number of images in itself. Then, the characteristic color determining section 274 may calculate the deviation of color calculated by the appearance frequency of color calculating section 264 based on the distribution stored in the average appearance frequency information storage section 272 to determine that the colors having larger deviation are the characteristic colors. Additionally, the characteristic color determining section 274 may determine that the colors having larger deviation are more characteristic colors.

Therefore, even if the appearance frequency of purple is less than that of the other color in the image on which a purple parasol is shown in a large sand beach, the purple can be used as the characteristic color of the image in the album provided that the average appearance frequency of purple is less than that of the other colors. Accordingly, the album creating apparatus 192 can appropriately select the characteristic colors stored in the album to arrange colors.

Here, the characteristic color determining section 274 may extract the characteristic colors from the colors included in the region except for the main subject in the image. Here, the main subject may be the image of an object occupying the maximum area in the image and also may be the image of an object positioned at the center of the image. Additionally, when the main subject is a person, the characteristic color determining section 274 may extract the characteristic colors from the colors included in the clothes of the person. At this time, the characteristic color determining section 274 may extract the region of the person and extract the characteristic colors among the colors included in the region of the extracted person. Additionally, the characteristic color determining section 274 may extract the characteristic colors among the colors of belongings held by the person being the main subject. At this time, the characteristic color determining section 274 may identify the range of the arm of the extracted person range by pattern matching with the pattern of the person and extract the characteristic color among the colors included in the belongings held by the end of the identified arm region.

Additionally, the characteristic color determining section 274 may preferentially select the color having higher saturation as the characteristic colors. Here, the characteristic color determining section 274 stores the reference evaluated values to be selected as the characteristic colors for each of plurality of various evaluation indexes, such as appearance frequency, saturation level, whether the color is included in the region except for the main subject and whether the color is included in the clothes of the person being the main subject. Then, the characteristic color determining section 274 may preferentially determine colors having the evaluated value satisfying more reference evaluated values as the characteristic colors. Additionally, the characteristic color determining section 274 may calculate the value obtained by summing the evaluated values for each of the evaluation indexes with a predetermined weighting and preferentially determine the color having larger summed value as the characteristic color.

Figure 4:
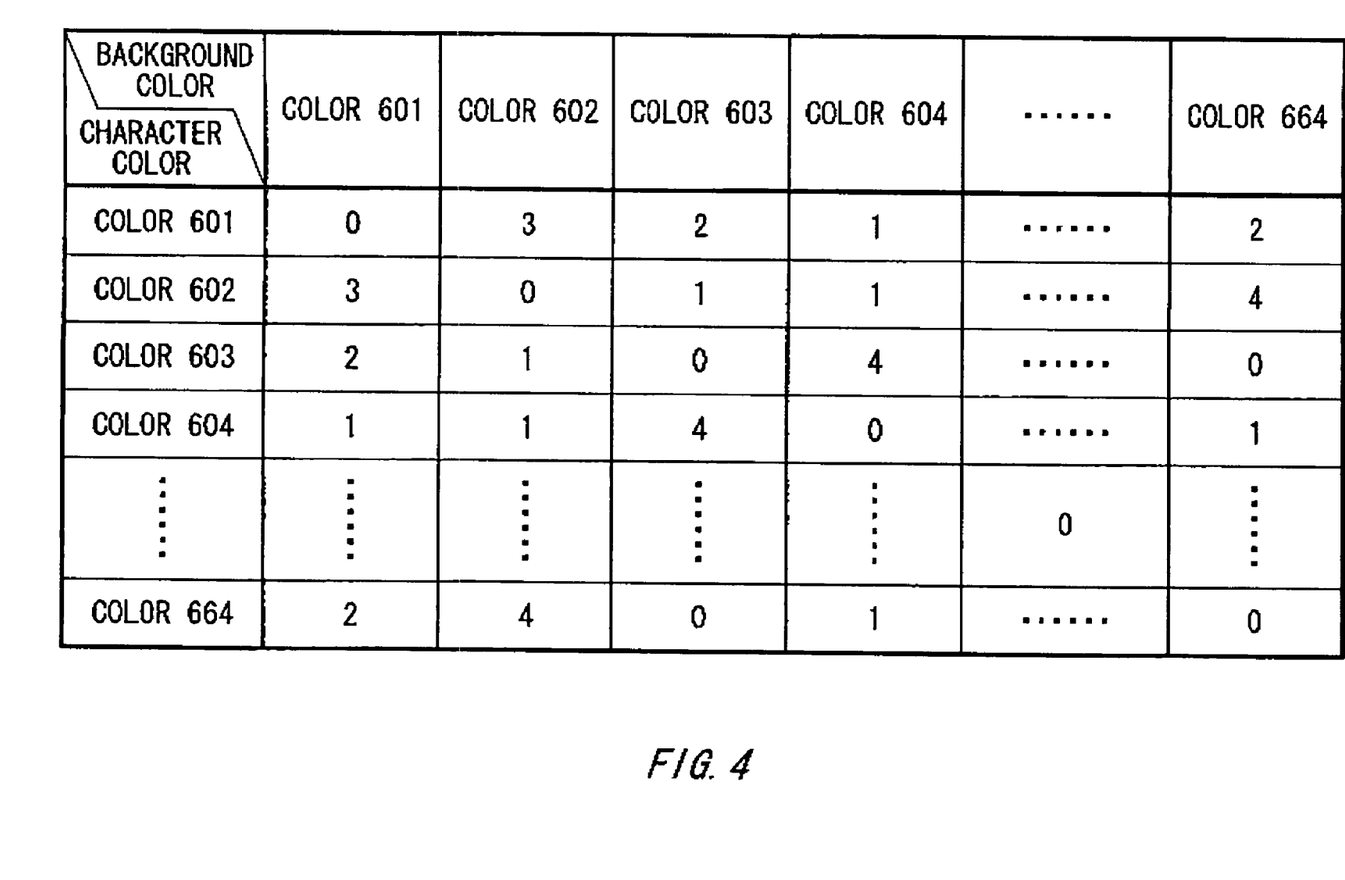
FIG. 4 is a table showing an example of combination color information stored in a combination color information storage section 280.

FIG. 4 is a table showing an example of combination color information stored in a combination color information storage section 280. The combination color information storage section 280 stores combination color information for each color pallet. Then, the combination color information storage section 280 stores appropriateness of the combination of the character color and the background color, in the case that if each of the plurality of colors included in a color pallet is character color, each of the plurality of colors in the same color pallet is the background color.

For example, the combination color information storage section 280 stores appropriateness 3, 2 and 1 as the appropriateness for the case that when a color 601 is used for characters, a color 602, a color 603 and a color 604 are used for the background thereof. Then, when the template color selecting section 276 selects one color as a character color, the template color selecting section 276 preferentially selects the colors having higher appropriateness stored in the combination color information storage section 280 in association with the selected colors as the background color. Here, the template color selecting section 276 may preferentially select the color having higher appropriateness among the colors except for the colors used for the region except for the background in one page. Additionally, when the template color selecting section 276 selects one color as the color for background, the template color selecting section 276 may preferentially select as the color for character the color having higher appropriateness stored in the combination color information storage section 280 in association with the selected color.

Here, the combination color information storage section 280 may store higher appropriateness for the color combination which makes the characters clear such as a combination of yellow as the character color and dark gray as the background color. For example, the combination color information section 280 may store higher appropriateness for a combination of (almost) complementary colors each other. Additionally, the combination color information storage section 280 may store higher appropriateness for a combination of the character color and the background color at least one of which saturation or lightness is greatly different from that of the character color. Thus, the combination color information storage section 280 stores appropriateness of the combination of the character color and the background color, so that the user 180 can easily obtain an album in which the colors are harmoniously arranged with the combination of the character colors and background colors which makes the characters clear using the album creating apparatus 192.

Here, the combination color information storage section 280 may be provided outside of the album creating apparatus 192. For example, the combination color information storage section 280 may be an external database to which the album creating apparatus 192 is communicatively connected through the network. Additionally, the combination color information storage section 280 may be an external storage medium such as a CD-ROM.

Figure 5:
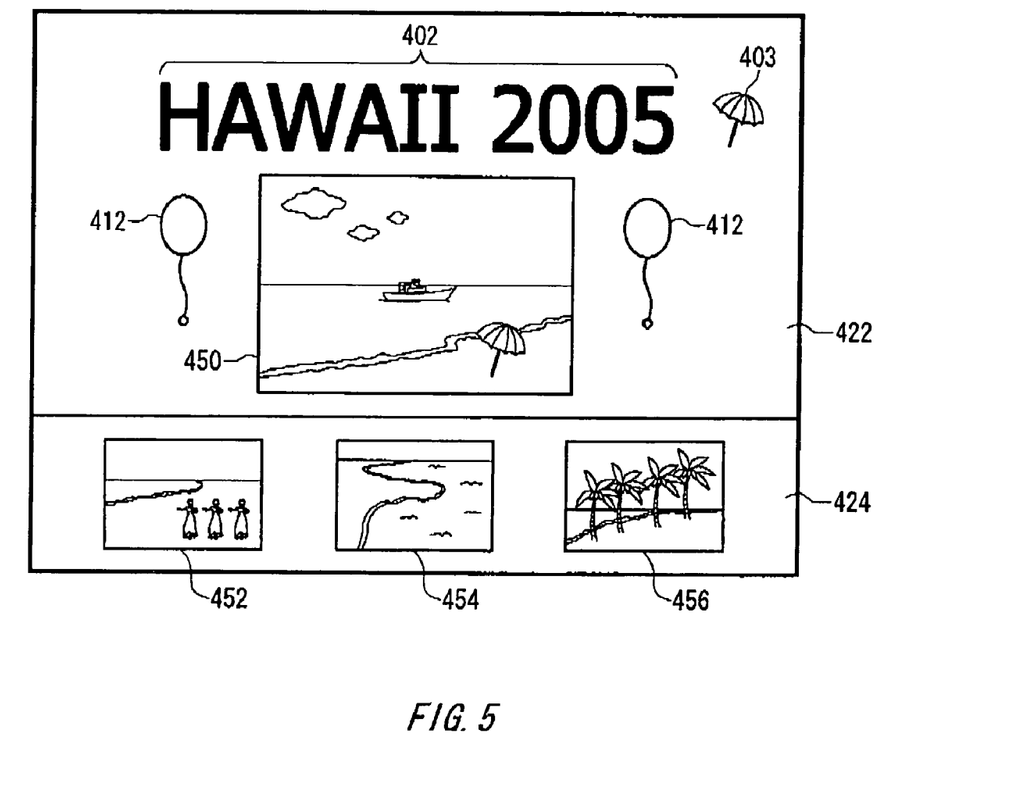
FIG. 5 shows an example of a template.

FIG. 5 shows an example of a template stored in the template storage section 254. Here, an example of the template for one page of the album is shown. The template storage section 254 stores a composition including a title of the page color arrangement region 402, an album logo image region 403, a color arrangement region 412 for the object which will be the background of the album such as a balloon and color arrangement regions 422 and 424 which will be the background colored all over. Additionally, the template storage section 254 stores image layouts 450, 452, 454 and 456 indicative of the position and the size of the image, respectively.

Then, the album creating section 256 may arrange colors having hue, lightness and saturation close to that of the characteristic colors determined by the characteristic color determining section 274 among the colors for template in the color arrangement region 422 occupying larger area in the color arrangement region. Additionally, the album creating section 256 may arrange colors having hue, lightness and saturation close to that of more characteristic color in the color arrangement region 422 occupying larger area in the color arrangement region. At this time, the template color selecting section 276 may select the color having the highest appropriateness among the colors for template stored in the combination color information storage section 280 in association with the colors arranged in the color arrangement region 422 which will be the background of the title as the color used for the color arrangement region 402 indicative of the title. At this time, the color same as that for the color arrangement region 402 indicative of the title is used for the album logo image region 403. Additionally, the album creating section 256 may arrange colors having saturation higher than that of the color arranged to the other color arrangement regions among the colors for template selected by the template color selecting section 276.

Additionally, the album creating section 256 may select, for the color arrangement regions having smaller size among the color arrangement region, such as the color arrangement region 412 in which the object is disposed, the characteristic color having larger amount of characteristic and lower average appearance frequency among the characteristic colors determined by the characteristic color determining section 274, select the colors having hue, brightness and saturation close to that of the selected characteristic colors from the colors for template and arrange the same. For example, when a purple parasol is shown on the image, and the characteristic color determining section 274 determines that the purple color of the parasol is the characteristic color, the album creating section 256 selects the color close to the purple color of the parasol among the colors for template and arranges the same in the color arrangement region 412. Therefore, the album creating section 256 can create an album which has the color arrangement harmonized with the image and in which the impressive colors for the use 180 are arranged.

Here, the characteristic color determining section 274 may determine the characteristic colors from all of the images to be stored in the album. Then, the album creating section 256 may arrange colors in all the page of the album using the colors for template selected by the template color selecting section 276. Additionally, the characteristic color determining section 274 may determine the characteristic colors for each page from the images to be stored in each page of the album. In this case, the characteristic color determining section 274 may determine the characteristic colors for each page from the colors included in the plurality of images classified into each page by the image classification section 290. Additionally, the characteristic color determining section 274 may determine the characteristic colors from the representative image for each page of the album, such as the image mainly disposed at the center of the page of the album (for example, the image disposed in the image layout 450). Then, the album creating section 256 may arrange colors based on the template for each page using the colors for template selected for each page by the template color selecting section 276.

The above-described album creating apparatus 192 can create an album with the color arrangement visually harmonized with the images stored in the album. For example, when the album will be created using images in which the sand beach, the ocean and the sky are shown on many times, the album creating apparatus 192 can automatically create the album using colors including light color such as white and light blue in the color pallet. Therefore, the user 180 can enjoyably view the album without feeling uncomfortable about the color arrangement of the album.

Figure 6:
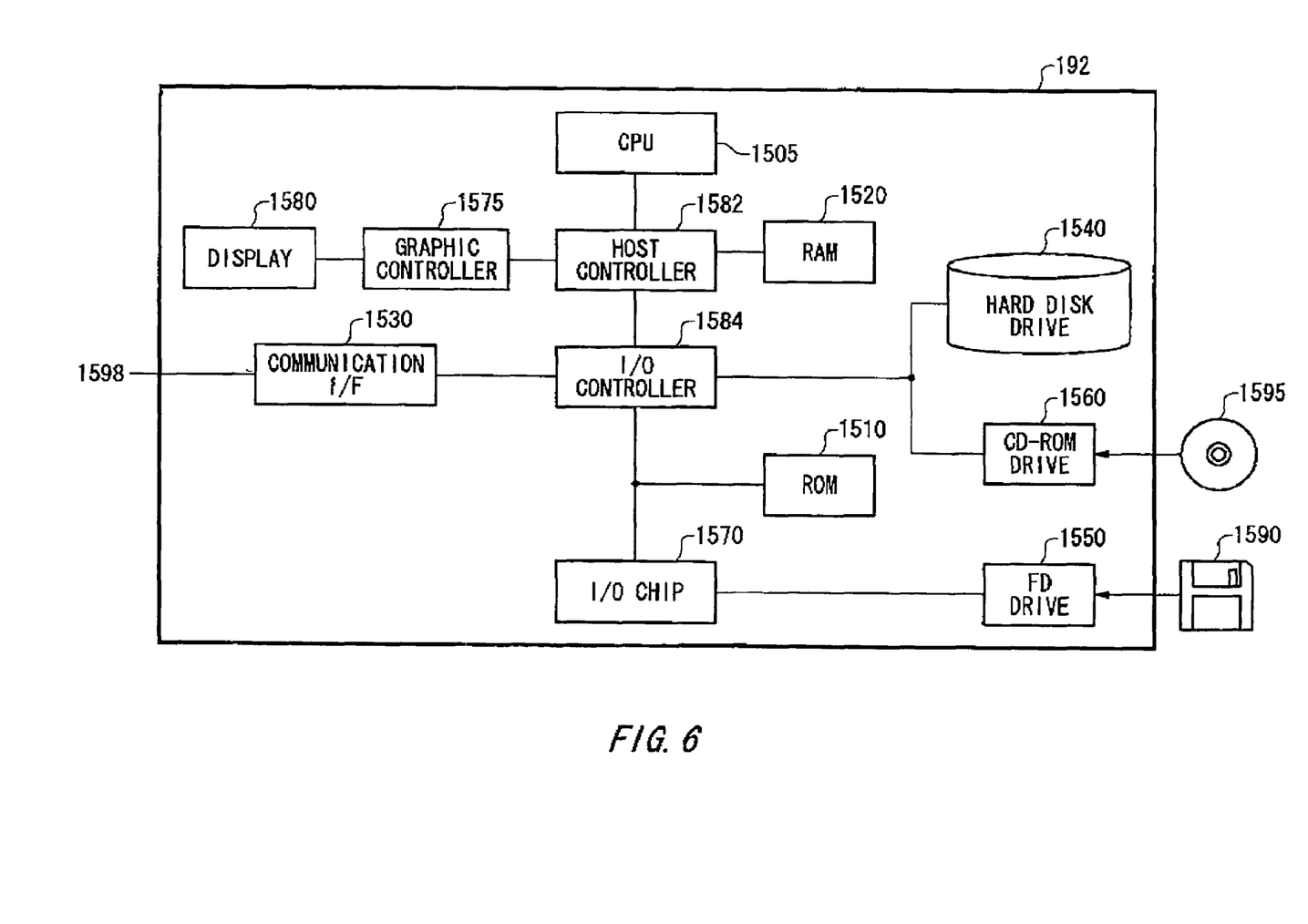
FIG. 6 shows an example of the hardware configuration of the album creating apparatus 192.

FIG. 6 shows an example of the hardware configuration of the album creating apparatus 192 according to the present embodiment. The album creating apparatus 192 includes a CPU periphery having a CPU 1505, a RAM 1520, a graphic controller 1575 and a display 1580 which are connected through a host controller 1582 each other, an input/output unit having a communication interface 1530, a hard disk drive 1540 and a CD-ROM drive 1560 which are connected to the host controller 1582 through an input/output controller 1584 and a legacy input/output unit having a ROM 1510, a flexible disk drive 1550 and an input/output chip 1570 which are connected to the input/output controller 1584.

The host controller 1582 connects the RAM 1520 to the CPU 1505 and the graphic controller 1575 which access the RAM 1520 with a high transfer rate. The CPU 1505 operates according to the programs stored in the ROM 1510 and the RAM 1520 to control each unit. The graphic controller 1575 obtains image data generated on a frame buffer provided in the RAM 1520 by the CPU 1505 and displays the same on the display 1580. Alternatively, the graphic controller 1575 may include therein a frame buffer for storing image data generated by the CPU 1505.

The input/output controller 1584 connects the host controller 1582 to the hard disk drive 1540, a communication interface 1530 and a CD-ROM drive 1560 which are relatively high-speed input/output units. The hard disk drive 1540 stores the program and data used by the CPU 1505. The communication interface 1530 is connected to a network communication device 1598 to transmit/receive the program or data. The CD-ROM drive 1560 reads the program or data from the CD-ROM 1595 and provides the same to the hard disk drive 1540 and the communication interface 1530 through the RAM 1520.

The ROM 1510, and the flexible disk drive 1550 and input/output chip 1570 which are relatively low-speed input/output units are connected to the input/output controller 1584. The ROM 1510 stores a boot program executed by the album creating apparatus 192 at activating and a program depending on the hardware of the album creating apparatus 192. The flexible disk drive 1550 reads the program or data from a flexible disk 1590 and provides the same to the hard disk drive 1540 and the communication interface 1530 through the RAM 1520. The input/output chip 1570 connects the flexible disk drive 1550 and various input/output units through such as a parallel port, a serial port, a keyboard port and a mouse port.

The program executed by the CPU 1505 is stored in a recording medium, such as the flexible disk 1590, the CD-ROM 1595, or an IC card and provided by the user. The program stored on the recording medium may be compressed or not compressed. The program is read from the recording medium, installed in the hard disk drive 1540, read by the RAM 1520 and executed by the CPU 1505.

The program executed by the CPU 1505 operates the album creating apparatus 192 to function as the image storage section 252, the image classification section 290, the image color arrangement analyzing section 260, an album color arrangement determining section 270, a template storage section 254 and an album creating section 256. Additionally, the program executed by the CPU 1505 operates the image color arrangement determining section 260 to function as the color extraction section 262 and the appearance frequency of color calculating section 264. Further, the program executed by the CPU 1505 operates the image color arrangement determining section 270 to function as the album color arrangement determining section 270 to function as the average appearance frequency information storage section 272, the characteristic color determining section 274, the template color selecting section 276, the color pallet information storage section 278 and the combination color information storage section 280.

The above-described program may be stored in an external storage medium. The external recording medium may be an optical storage medium such as a DVD and a PD, a magneto-optical recording medium such as a MD, a tape medium and a semiconductor memory such as an IC card. A storage medium such as a hard disk or a RAM which is provided in the server system connected to a private communication network or Internet is used as the recording medium to provide the program to the album creating apparatus 192 through the network.

While the present invention have been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

What is claimed is:

1. An album creating apparatus for creating an album including a plurality of images, comprising:
   an image color arrangement analyzing section for analyzing a color arrangement of the plurality of images; and
   an album color arrangement determining section for determining the color arrangement of templates of the album including the plurality of images based on the color arrangement of the plurality of images analyzed by the image arrangement color analyzing section, the album color arrangement determining section including
      an average appearance frequency information storage section for previously storing an average appearance frequency indicative of the average frequency at which each of a plurality of colors may appear in the images in association with each of the plurality of colors, and
      a characteristic color determining section for determining characteristic colors, which are colors characteristic of the plurality of images, based on an appearance frequency of the plurality of colors and based on said average appearance frequency stored in the average appearance frequency information storage section.

2. The album creating apparatus according to claim 1, wherein the image color arrangement analyzing section includes:
   a color extraction section for extracting a plurality of colors included in the plurality of images; and
   an appearance frequency of color calculating section for calculating the appearance frequency of the plurality of colors extracted by the color extraction section, and
wherein the album color arrangement determining section includes:
   a template color selecting section for selecting colors for template used for templates of the album including the plurality of images based on the characteristic color determined by the characteristic color determining section.

3. The album creating apparatus according to claim 2, wherein
   the album color arrangement determining section further includes a color pallet information storage section for storing plural pieces of information on the color pallet indicative of a combination of a plurality of predetermined colors,
   the template color selecting section selects the color pallet including the characteristic color determined by the characteristic color determining section and selects the colors included in the selected color pallet as colors for template.

4. The album creating apparatus according to claim 3, wherein,
   the characteristic color determining section determines a plurality of characteristic colors in the plurality of images based on the appearance frequency of the plurality of colors calculated by the appearance frequency of color calculating section, and
   the template color selecting section selects a color pallet including the plurality of characteristic colors determined by the characteristic color determining section and selects the colors included in the selected color pallet as the colors for template.

5. The album creating apparatus according to claim 2, wherein
   the album color arrangement determining section further includes a combination color information storage section for storing combination color information indicative of colors to be used for the background of characters in association with the colors for the characters, and
   the template color selecting section selects colors for either of the characters or the background included in the template based on the characteristic colors determined by the characteristic color determining section and selects the colors stored in the combination color information storage section in association with the selected colors as colors for the other of the characters or the background.

6. The album creating apparatus according to claim 5, wherein
   the album color arrangement determining section further includes a color pallet information storage section for storing plural pieces of information on a color pallet indicative of a plurality of predetermined color combinations,
   the combination color information storage section stores combination color information in association with the color pallet stored in the color pallet information storage section and each of the plurality of colors included in the color pallet, and
   the template color selecting section selects the color pallet including the characteristic colors determined by the characteristic color determining section, selects the colors included in the selected color pallet as colors for either of the characters or the background which are included in the template and selects the colors stored in the combination color information storage section in association with the selected color pallet and the selected colors as colors for the other of the characters or the background.

7. The album creating apparatus according to claim 1 further comprising an image classification section for classifying a plurality of images into each page, wherein
   the image color arrangement analyzing section analyzes for each page the color arrangement of the plurality of images classified into each page by the image classification section, and
   the album color arrangement determining section determines the color arrangement of the template of the album including the plurality of images for each page classified by the image classification section based on the color arrangement of the plurality of images analyzed by the image color arrangement analyzing section.

8. An album creating apparatus for creating an album including a plurality of images, comprising:
- an image color arrangement analyzing section for analyzing a color arrangement of the plurality of images; and
- an album color arrangement determining section for determining the color arrangement of templates of the album including the plurality of images based on the color arrangement of the plurality of images analyzed by the image arrangement color analyzing section,
- wherein the image color arrangement analyzing section includes:
- a color extraction section for extracting a plurality of colors included in the plurality of images; and
- an appearance frequency of color calculating section for calculating the appearance frequency of the plurality of colors extracted by the color extraction section, and
- wherein the album color arrangement determining section includes:
- a characteristic color determining section for determining characteristic colors which are colors characteristic of the plurality of images based on the appearance frequency of the plurality of colors calculated by the appearance frequency of color calculating section; and
- a template color selecting section for selecting colors for template used for templates of the album including the plurality of images based on the characteristic color determined by the characteristic color determining section,
- wherein the album color arrangement determining section further includes an average appearance frequency information storage section for previously storing an average appearance frequency indicative of the average frequency at which each of the plurality of colors may be appeared in the image in association with each of the plurality of colors,
- the characteristic color determining section determines that the color of which appearance frequency calculated by the appearance frequency of color calculating section is larger than the average appearance frequency stored in the average appearance frequency information storage section is the characteristic colors for the plurality of images.

9. An album creating apparatus for creating an album including a plurality of images, comprising:
- an image color arrangement analyzing section for analyzing a color arrangement of the plurality of images; and
- an album color arrangement determining section for determining the color arrangement of templates of the album including the plurality of images based on the color arrangement of the plurality of images analyzed by the image arrangement color analyzing section,
- wherein the image color arrangement analyzing section includes:
- a color extraction section for extracting a plurality of colors included in the plurality of images; and
- an appearance frequency of color calculating section for calculating the appearance frequency of the plurality of colors extracted by the color extraction section, and
- wherein the album color arrangement determining section includes:
- a characteristic color determining section for determining characteristic colors which are colors characteristic of the plurality of images based on the appearance frequency of the plurality of colors calculated by the appearance frequency of color calculating section; and
- a template color selecting section for selecting colors for template used for templates of the album including the plurality of images based on the characteristic color determined by the characteristic color determining section,
- wherein the album color arrangement section further includes a color pallet information storage section for storing plural pieces of information on a color pallet indicative of a plurality of predetermined color combinations, and
- the template color selecting section selects the color pallet including the colors of which difference from the characteristic colors determined by the characteristic color determining section is less than a predetermined color difference and selects the colors included in the selected color pallet as colors for template.

10. The album creating apparatus according to claim 9, wherein
- the characteristic color determining section determines a plurality of characteristic colors in the plurality of images based on the appearance frequency of the plurality of colors calculated by the appearance frequency of color calculating section, and
- the template color selecting section selects a color pallet including a plurality of colors of which difference from the plurality of characteristic colors determined by the characteristic color determining section is less than a predetermined color difference and selects the colors included in the selected color pallet as colors for template.

11. An album creating method for creating an album including a plurality of images by utilizing one or more processors, comprising:
- analyzing, using at least one processor, the color arrangement of the plurality of images; and
- determining the color arrangement of a template of the album including the plurality of images based on the color arrangement of the plurality of images analyzed in the color arrangement analyzing step, said determining step including
  - determining characteristic colors which are colors characteristic of the plurality of images based on an appearance frequency of a plurality of colors and based on a previously stored average appearance frequency,
  - wherein the average appearance frequency is indicative of the average frequency at which each of the plurality of colors may appear in the images in association with each of the plurality of colors.

12. A computer readable storage medium storing a computer program for creating an album including a plurality of images, the computer program when executed causes a processor to perform the steps of:
- analyzing a color arrangement of the plurality of images; and
- determining the color arrangement of templates of the album including the plurality of images based on the color arrangement of the plurality of images obtained in the analyzing step, wherein said determining step determines characteristic colors which are colors characteristic of the plurality of images based on an appearance frequency of a plurality of colors and a previously stored average appearance frequency,
- wherein the average appearance frequency is indicative of the average frequency at which each of the plurality of colors may appear in the images in association with each of the plurality of colors.

* * * * *